(12) United States Patent
Mochizuki et al.

(10) Patent No.: US 10,051,280 B2
(45) Date of Patent: Aug. 14, 2018

(54) VIDEO ENCODING/DECODING SYSTEM AND DIAGNOSIS METHOD THEREOF

(71) Applicant: Renesas Electronics Corporation, Tokyo (JP)

(72) Inventors: Seiji Mochizuki, Tokyo (JP); Toshiyuki Kaya, Tokyo (JP); Hiroshi Ueda, Tokyo (JP); Tetsuya Shibayama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 123 days.

(21) Appl. No.: 14/928,735

(22) Filed: Oct. 30, 2015

(65) Prior Publication Data
US 2016/0198174 A1    Jul. 7, 2016

(30) Foreign Application Priority Data

Jan. 7, 2015    (JP) ................................. 2015-001530

(51) Int. Cl.
*H04B 1/66* (2006.01)
*H04N 19/46* (2014.01)
(Continued)

(52) U.S. Cl.
CPC ........... *H04N 19/46* (2014.11); *H04N 17/004* (2013.01); *H04N 19/44* (2014.11); *H04N 19/65* (2014.11); *H04N 19/89* (2014.11)

(58) Field of Classification Search
CPC ...... H04N 17/004; H04N 19/46; H04N 19/44; H04N 19/65; H04N 19/89
See application file for complete search history.

(56) References Cited

U.S. PATENT DOCUMENTS 4,718,065 A * 1/1988 Boyle .............. G01B 31/31833
714/725
7,752,511 B2 * 7/2010 Fulton .................. G05B 19/058
714/725
(Continued)

FOREIGN PATENT DOCUMENTS

EP    1 732 331 A1    12/2006
EP    2 509 332 A1    10/2012
(Continued)

OTHER PUBLICATIONS

Extended European Search Report dated Jun. 1, 2016.

*Primary Examiner* — Sathyanaraya V Perungavoor
*Assistant Examiner* — Peet Dhillon
(74) *Attorney, Agent, or Firm* — McGinn I.P. Law Group, PLLC

(57) ABSTRACT

A video encoding/decoding system includes a video encoding device and a video decoding device. The video encoding device includes an encoding part for encoding a diagnostic image or normal image. The video decoding device includes a decoding part for decoding the image encoded by the encoding part, a check signal generation part for generating a check signal of the decoded image, a storage part for storing the expected value of the check signal of the diagnostic image or the check signal generated by the check signal generation part, and a comparison part for comparing the check signal stored in the storage part with the check signal generated by the check signal generation part, in order to detect failure in all the paths from the image input part of the video encoding device to the image output part of the video decoding device.

5 Claims, 11 Drawing Sheets

(51) Int. Cl.
*H04N 19/44* (2014.01)
*H04N 19/89* (2014.01)
*H04N 19/65* (2014.01)
*H04N 17/00* (2006.01)

(56) References Cited

U.S. PATENT DOCUMENTS

| | | |
|---|---|---|
| 8,457,199 B2 | 6/2013 | Jebb |
| 2005/0089104 A1* | 4/2005 | Kim ........................ H04N 19/70 |
| | | 375/240.27 |
| 2005/0216815 A1* | 9/2005 | Novotny ................ H04N 19/46 |
| | | 714/758 |
| 2008/0101468 A1* | 5/2008 | Ishikawa .............. H04N 17/045 |
| | | 375/240.12 |
| 2008/0192826 A1 | 8/2008 | Jebb |
| 2014/0247366 A1* | 9/2014 | Solhusvik .............. H04N 5/335 |
| | | 348/187 |

FOREIGN PATENT DOCUMENTS

| | | |
|---|---|---|
| JP | 2006-148430 A | 6/2006 |
| JP | 2008-546338 A | 12/2008 |

\* cited by examiner

VIDEO ENCODING/DECODING SYSTEM AND DIAGNOSIS METHOD THEREOF

CROSS-REFERENCE TO RELATED APPLICATIONS

The disclosure of Japanese Patent Application No. 2015-001530 filed on Jan. 7, 2015 including the specification, drawings and abstract is incorporated herein by reference in its entirety.

BACKGROUND

The present invention relates to a video encoding/decoding system, and is applicable, for example, to a video encoding/decoding system with failure detection function.

Driver support function and automated driving function for vehicles have been put into practice in recent years. In a system including an in-vehicle camera and an image analysis device for the purpose of detecting obstacles or other purposes, the resolution of the images to be handled has been increased to achieve a high precision. Because of this, digital video transmission using image compression techniques has been widely used. A high level of safety is required for the driver support function and automated driving function. Thus, it is necessary to use a method that can detect failure in the video encoding device, the transmission path of the compressed image, and the video decoding device. There have been proposed failure detection techniques, for example, as disclosed in Japanese Unexamined Patent Application Publication Nos. 2006-148430 (Patent Document 1) and 2008-546338 (Patent Document 2), as well as in the corresponding U.S. Pat. No. 8,457,199 (Patent Document 3).

Patent Document 1 describes the following: "The technique is an image recording device for compressing a digitally converted video signal in an image compression part 6, extending data recoded in a hard disk recording part 11, and outputting the extended data. The image recording device includes an ROM 9 for recoding a reference data as well as a test data generation part 3, in which the data of the test data generation part 3 is compressed and stored in the image compression part 6. The compressed test data is compared with the reference data. The data of the test data generation part 3 is stored in an RAM 10 to compress and store in the image compression part 6. Then, the reference data of the ROM 9 and the test data compressed in the RAM 10 are compared with each other to determine whether the data is normal or not, in order to perform self-diagnosis to check the fact that abnormality occurred in either the hard disk recording part 11 or the image compression part 6."

Patent Document 2 describes the following technique: "In a transmitter, a video signal is encoded by generating a differential signal (in 2), showing the difference between the transmission image and the predicted image based on the image that is stored and partially decoded. The differential signal is decoded to generate a new partially decoded image. The transmitter also generates a check signal, such as CRC, which is used as a function of the partially decoded image. A receiver decodes the differential signal and generates a decoded image. Then, the receiver compares the decoded image with the check signal. If the two do not match, the receiver generates an error signal."

SUMMARY

The self-diagnosis described in Patent Document 1 can detect failure in the image compression part but may not detect failure in the image extension part. Further, the reference data is a bit stream with a large size, so that a large capacity ROM is required and the cost is high. In addition, the test data/expected value can be huge in order to obtain sufficient coverage. As a result, it is difficult to detect soft errors.

In the error detection system described in Patent Document 2 or 3, CRC codes generated by the respective image encoder and the decoder are generated from the output of the encoder. For this reason, the CRC codes will match even if the output of the encoder is an erroneous result due to a failure. In addition, the transmission of the CRC code from the image encoder to the decoder consumes an extra bandwidth of the transmission path.

An object of the present invention is to provide a technology that can detect failure in all the paths from the image input part of the video encoding device to the image output part of the video decoding device.

Other objects, advantages and novel features of the invention will become more apparent from the following detailed description of the invention when taken in conjunction with the accompanying drawings.

A typical one of the aspects of the present invention will be briefly described below.

In other words, in a video encoding/decoding system, an image that is decoded by a video encoding device is decoded by a video decoding device in order to detect failure based on a check signal generated from the decoded image and on a check signal stored in advance.

According to the video encoding/decoding system, it is possible to detect failure in all the paths from the image input part of the video encoding device to the image output part of the video decoding device.

DETAILED DESCRIPTION

Figure 1:
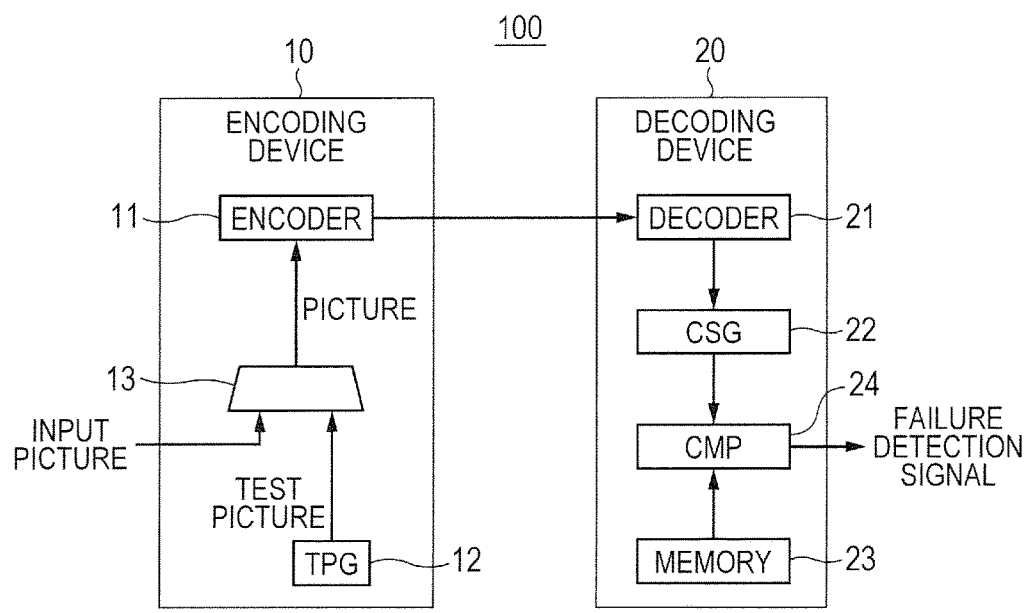
FIG. 1 is a block diagram showing a video encoding/decoding system according to an embodiment.

Hereinafter, the preferred embodiment, example, and applications will be described with reference to the accompanying drawings. Note, however, that in the following description the same components are denoted by the same reference numerals and the redundant description thereof may be omitted.

Embodiment

Figure 2:
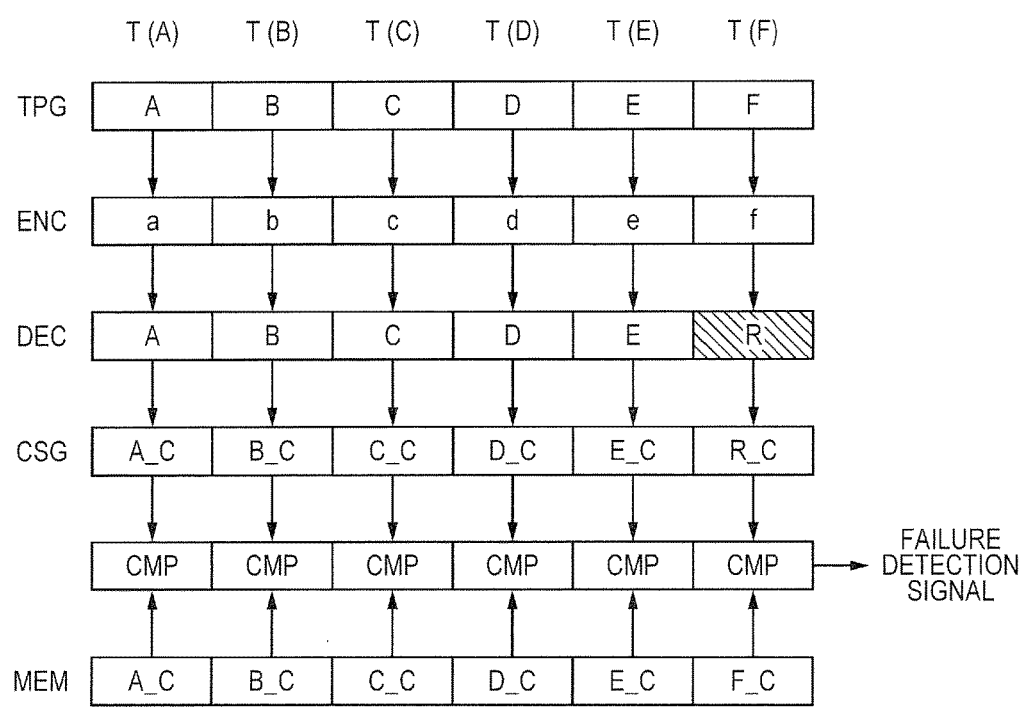
FIG. 2 is a schematic diagram showing a first failure detection operation of the video encoding/decoding system according to the embodiment.
Figure 3:
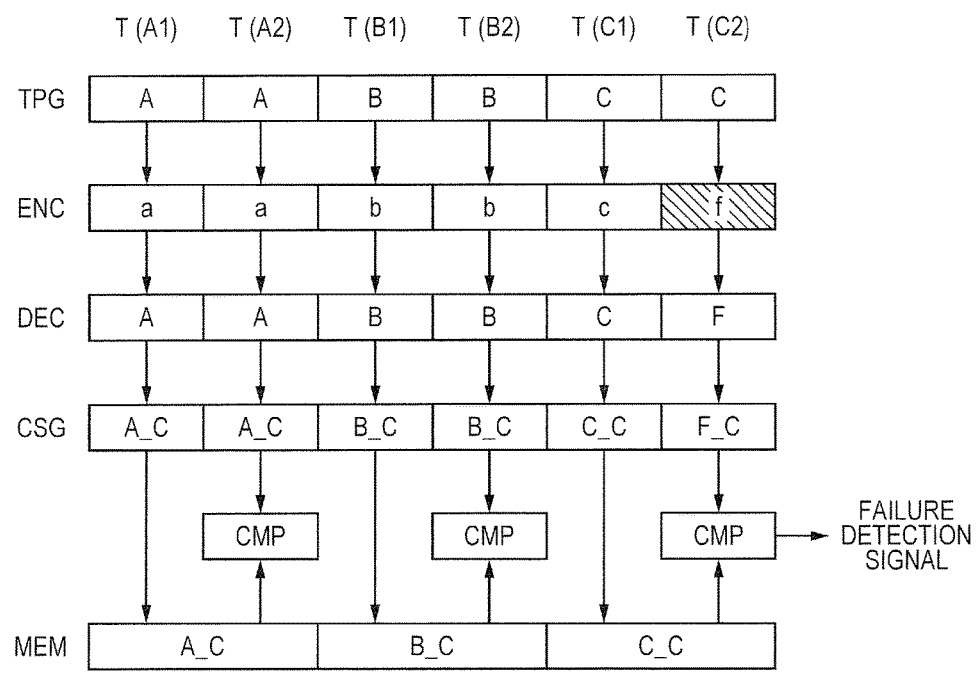
FIG. 3 is a schematic diagram showing a second failure detection operation of the video encoding/decoding system according to the embodiment.
Figure 4:
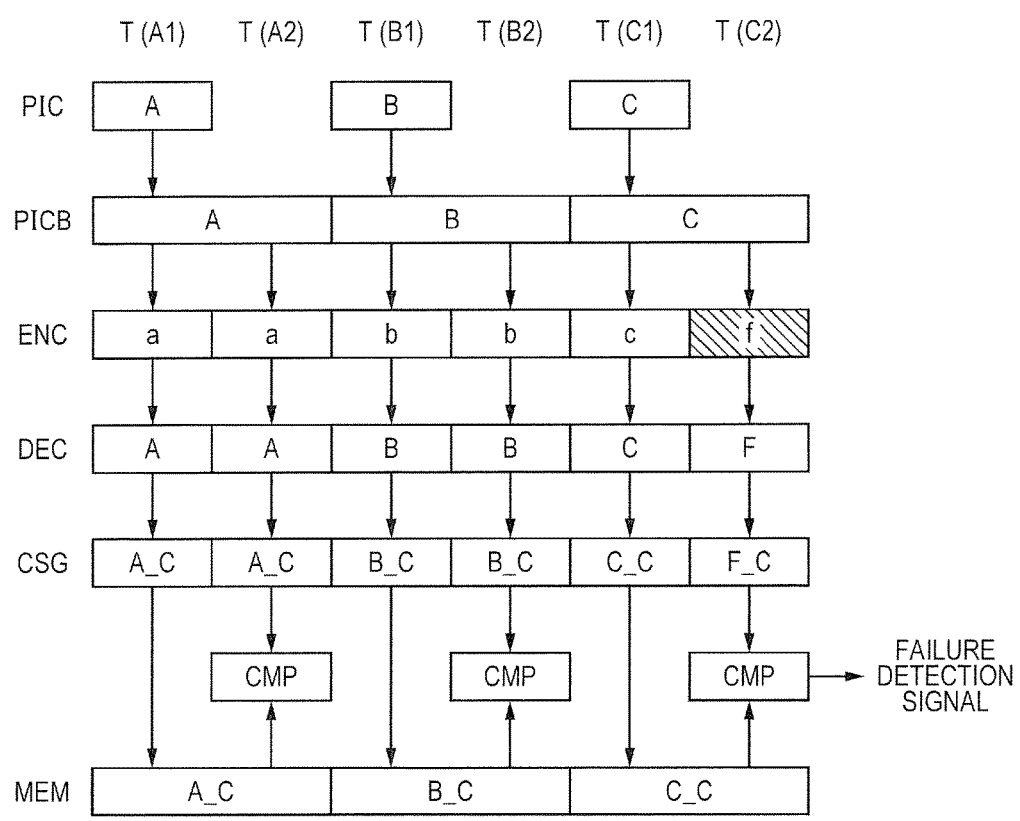
FIG. 4 is a schematic diagram showing a third failure detection operation of the video encoding/decoding system according to the embodiment.

First, a video encoding/decoding system according to an embodiment will be described with reference to FIGS. 1 to 4. FIG. 1 is a block diagram showing the configuration of a video encoding/decoding system according to the embodiment. FIG. 2 is a schematic diagram showing an example of a first failure detection operation of the video encoding/decoding system according to the embodiment. FIG. 3 is a schematic diagram showing an example of a second failure detection operation of the video encoding/decoding system according to the embodiment. FIG. 4 is a schematic diagram showing an example of a third failure detection operation of the video encoding/decoding system according to the embodiment.

As shown in FIG. 1, a video encoding/decoding system 100 according to the embodiment includes a video encoding device 10 and a video decoding device 20. The video encoding device 10 includes an encoding part 11 for ending an image. The video decoding device 20 includes: a decoding part 21 for decoding the encoded image; a check signal generation part (CSG) 22 for generating a check signal from the decoded image; a storage part 23 for storing the check signal; and a comparison part (CMP) 24 for comparing the check signal generated by the check signal generation part 22 with the check signal stored in the storage part 23.

It is preferable that the video encoding device 10 further includes a diagnostic image generation part 12 for generating a diagnostic image (TEST PICTURE), as well as a switching circuit 13 for switching between the input image (INPUT PICTURE) and the diagnostic image.

The video encoding/decoding system 100 performs a failure detection operation (diagnosis) by one or a combination of the followings.

(1) First Failure Detection Operation (First Diagnosis)

The encoding part 11 encodes (compresses) a diagnostic image output from the diagnostic image generation part 12 in a predetermined order, and transmits to the video decoding device 20. The decoding part 21 decodes (extends) the encoded image received from the video encoding device 10, and generates a check signal of the decoded image. The comparison part 24 compares the check signal generated by the check signal generation part 22 with the expected value (check signal of the diagnostic image) which is stored in advance in the storage part 23. If the comparison result is a mismatch, the comparison part 24 determines that a failure has occurred, and outputs (or activates) the failure detection signal.

An example of the first failure detection operation will be described with reference to FIG. 2. It is assumed that failure detection operations from A image, B image, C image, D image, E image, and F image for diagnosis are T(A), T(B), T(C), T(D), T(E), and T(F). In T(A), the diagnostic image generation part (TPG) 12 outputs an A image for diagnosis. Then, the encoding part (ENC) 11 generates an a image by encoding the A image. The decoding part (DEC) 21 generates the A image by decoding the a image. Then, the check signal generation part (CSG) 22 generates a check signal (A_C) of the A image. The comparing part (CMP) 24 compares the check signal (A_C) of the A image, which is the expected value stored in the storage part (MEM) 23, with the check signal (A_C) of the A image that is generated by the check signal generation part 22. In this case, the check signals (A_C) match, so that the comparison part 24 does not output (or inactivates) the failure detection signal. Similarly, the check signals match in the operations from T(B) to T(E), so that the comparison part 24 does not output (or inactivates) the failure detection signal.

In T(F), the diagnostic image generation part (TPG) 12 generates an F image for diagnosis. Then, the encoding part (ENC) 11 generates an f image by encoding the F image. Due to a failure in the decoding part (DEC) 21, the decoding part (DEC) 21 generates an R image by decoding the f image. Then, the check signal generation part (CSG) 22 generates a check signal (R_C) of the R image. The comparison part (CMP) 24 compares the check signal (F_C) of the F image, which is the expected value stored in the storage part (MEM) 23, with the check signal (R_C) of the R image that is generated by the check signal generation part 22. In this case, the check signals do not match, so that the comparison part 24 outputs (or activates) the failure detection signal.

(2) Second Failure Detection Operation (Second Diagnosis)

The diagnostic image generation part 12 randomly generates a diagnostic image. The encoding part 11 encodes the output diagnostic image, and transmits the encoded image to the video decoding device 20. The decoding part 21 decodes the encoded image received from the video encoding device 10. Then, the check signal generation part 22 generates a check signal of the decoded image. After the encoding-decoding operation is performed twice on the same diagnostic image, the comparison part 24 detects a failure by checking a match between the first check signal of the decoded image stored in the storage part 23, and the second check signal of the decoded image stored in the storage part 23. If the comparison result is a mismatch, the comparison part 24 determines that a failure has occurred and outputs (or activates) the failure detection signal.

An example of the second failure detection operation will be described with reference to FIG. 3. It is assumed that the first and second failure detection operations from the A image, B image, and C image for diagnosis are T(A1), T(A2), T(B1), T(B2), T(C1), and T(C2). In T(A1), the diagnostic image generation part (TPG) 12 generates an A image for diagnosis, and the encoding part (ENC) 11 generates an a image by encoding the A image. The decoding part (DEC) 21 generates the A image by decoding the a image. Then, the check signal generation part (CSG) 22 generates a check signal (A_C) of the A image and stores in the storage part (MEM) 23. In T(A2), the diagnostic image generation part (TPG) 12 outputs the A image for diagnosis, which is the same image as in T(A1). Then, the encoding part (ENC) 11 generates an a image by encoding the A image. The decoding part (DEC) 21 generates the A image by decoding the a image. Then, the check signal generation part (CSG) 22 generates the check signal (A_C) of the A image. The comparison part (CMP) 24 compares the first check signal of the A image that is stored in the storage part (MEM) 23 with the second check signal (A_C) of the A image that is generated by the check signal generation part 22. In this case, the check signals (A_C) match, so that the comparison part 24 does not output (or inactivates) the failure detection signal. Similarly, the check signals match in T(B2), so that the comparison part 24 does not output (or inactivates) the failure detection signal.

In T(C1), the diagnostic image generation part (TPG) 12 generates a C image for diagnosis. Then, the encoding part (ENC) 11 generates a c image by encoding the C image. The decoding part (DEC) 21 generates the C image by decoding the c image. Then, the check signal generation part (CSG) 22 generates a check signal of the C image and stores in the storage part (MEM) 23. In T(C2), the diagnostic image generation part (TPG) 12 outputs the C image for diagnosis, which is the same image as in T(C1). Then, due to a failure in the encoding part (ENC) 11, the encoding part (ENC) 11 generates an f image by encoding the C image. The decoding part (DEC) 21 generates the F image by decoding the f image. Then, the check signal generation part (CSG) 22 generates a check signal (F_C) of the F image. The comparison part (CMP) 24 compares the first check signal (C_C) of the C image that is stored in the storage part (MEM) 23 with the second check signal (F_C) of the F image that is generated by the check signal generation part 22. In this case, the check signals do not match, so that the comparison part 24 outputs (or activates) the failure detection signal.

(3) Third Failure Detection Operation (Third Diagnosis)

Different from the first and second failure detection operations, the third failure detection operation performs failure detection by a normal video encoding/decoding operation (normal operation). In other words, in the normal operation, part or whole of the input image as well as encoding parameters are stored in the encoding part 11, and a check signal of a decoded image is generated and stored in the storage part 23. The same operation is performed again to obtain a check signal of the decoded image. Then, the obtained two check signals are compared by the comparison part 24. If the comparison result is a mismatch, the comparison part 24 determines that a failure has occurred.

An example of the third failure detection operation will be described with reference to FIG. 4. It is assumed that the first and second failure detection operations from the normal A image, B image and C image are T(A1), T(A2), T(B1), T(B2), T(C1), and T(C2). In T(A1), the encoding part (ENC) 11 generates an a image by encoding the input A image. Here, the image data or other information necessary for the second encoding is stored in an image storage part (PICB) not shown. The decoding part (DEC) 21 generates the A image by decoding the a image. Then, the check signal generating part (CSG) 22 generates a check signal (A_C) of the A image and stores in the storage part (MEM) 23. In T(A2), the encoding part (ENC) 11 generates an a image by encoding the A image stored in PICB. The decoding part (DEC) 21 generates the A image by decoding the a image. Then, the check signal generation part (CSG) 22 generates a check signal (A_C) of the A image. The comparison part (CMP) 24 compares the first check signal (A_C) of the A image that is stored in the storage part (MEM) 23, with the check signal (A_C) of the A image that is generated by the check signal generation part 22. In this case, the check signals (A_C) match, so that the comparison part 24 does not output (or inactivates) the failure detection signal. Similarly, the check signals match in T(B2), the comparison part 24 does not output (or inactivates) the failure detection signal.

In T(C1), the encoding part (ENC) 11 generates a c image by encoding the input C image. Here, the image data or other information necessary for the second encoding is stored in PICB. The decoding part (DEC) 21 generates the C image by decoding the c image. Then, the check signal generation part (CSG) 22 generates a check signal (C_C) of the C image and stores in the storage part (MEM) 23. In T(C2), the encoding part (ENC) 11 generates an f image by encoding the C image stored in PICB due to a failure. The decoding part (DEC) 21 generates the F image by decoding the f image. Then, the check signal generation part (CSG) 22 generates a check signal (F_C) of the F image. The comparison part (CMP) 24 compares the first check signal (C_C) of the C image that is stored in the storage part (MEM) 23 with the second check signal (F_C) of the F image that is generated by the check signal generation part 22. In this case, the check signals do not match, so that the comparison part 24 outputs (or activates) the failure detection signal.

In the video encoding/decoding system 100, it is possible to detect failure in all the paths from the image input part of the encoding part 11 of the video encoding device 10 to the image output part of the decoding part 21 of the video decoding device 20. In addition, any additional information such as a check signal is not transmitted from the video encoding device 10, so that the extra bandwidth of the communication path (transmission path) is not consumed.

In the first failure detection operation, the expected value is the check signal whose size is smaller than the bit stream, so that the storage cost is low.

In the second failure detection operation, the coverage of the failure detection is increased by the use of numerous diagnostic images. At the same time, there is no need to use expected values and the storage capacity of the storage part 23 can be reduced. As a result, the cost of storing expected values is lower than that in the first failure detection operation.

In the third failure detection operation, as compared to the first and second failure detection operations, the operation exclusive for failure detection is not required, so that the power consumption is reduced. Further, different from the first and second failure detection operations, the failure detection is performed during the normal operation, making it possible to detect soft errors.

Example

Figure 5:
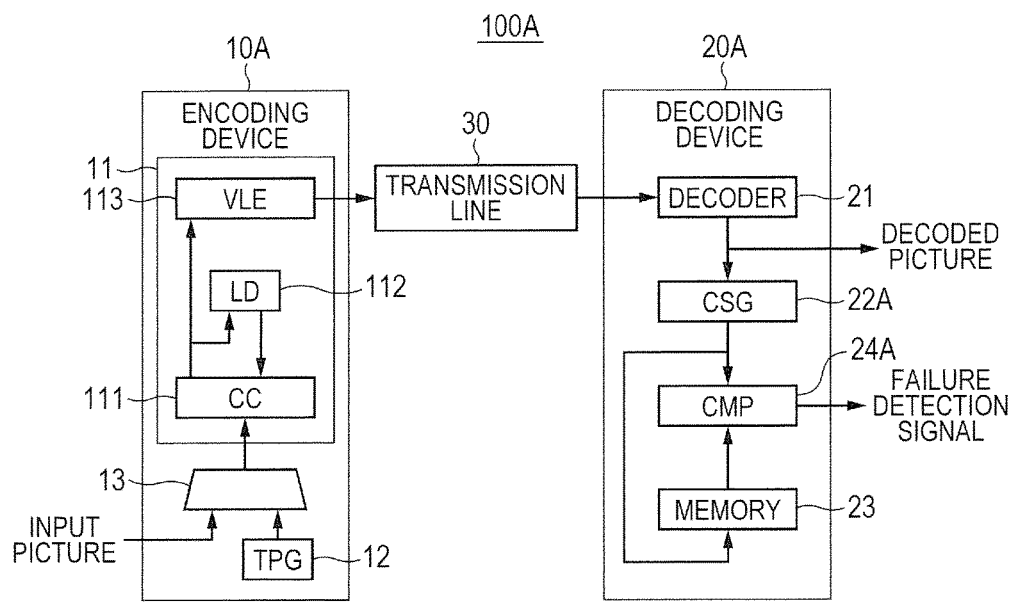
FIG. 5 is a block diagram showing the video encoding/decoding system according to an example.
Figure 6:
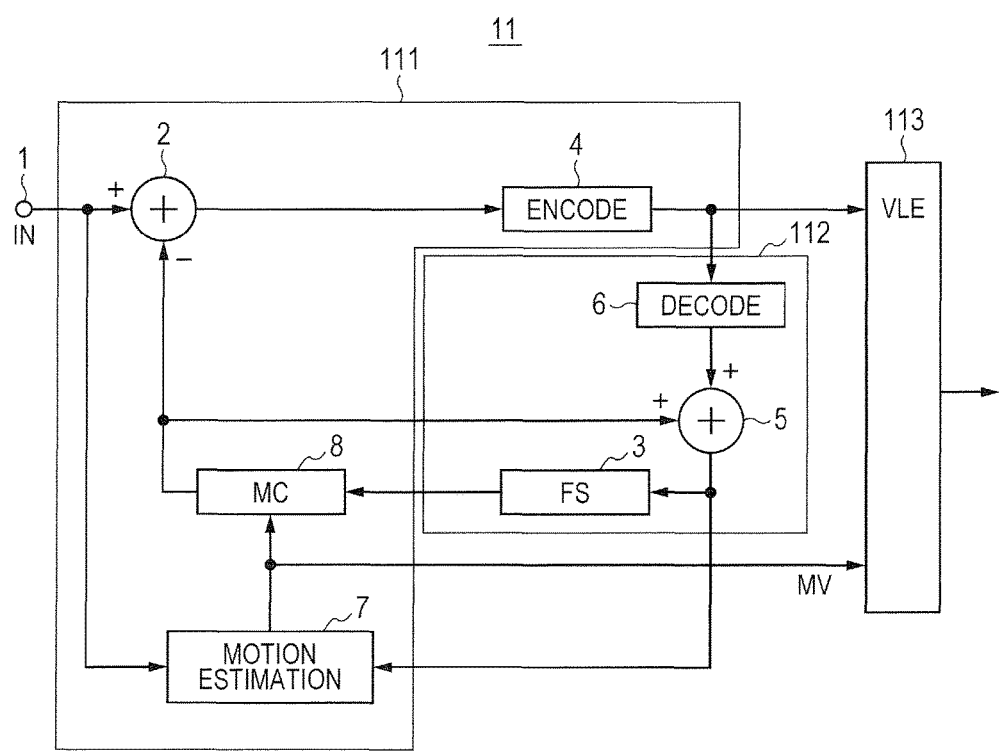
FIG. 6 is a block diagram showing a video encoding device according to an example.
Figure 7:
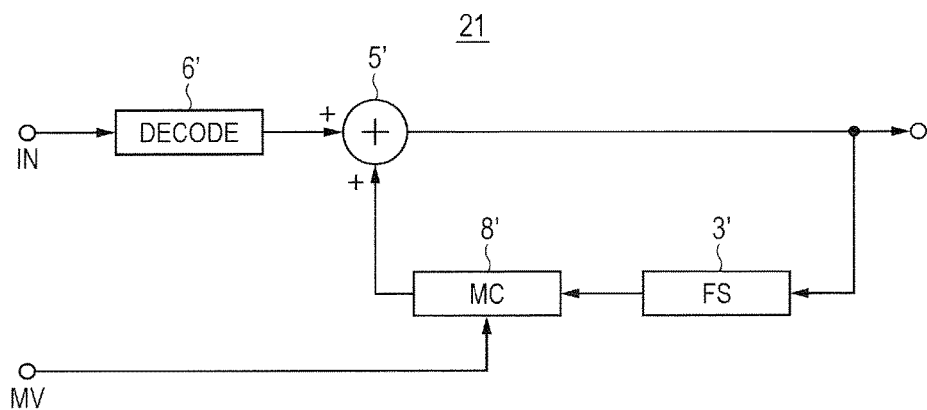
FIG. 7 is a block diagram showing a video decoding device according to the example.

Next, the configuration of a video encoding/decoding system according to an example will be described with reference to FIGS. 5 to 7. FIG. 5 is a block diagram showing the configuration of a video encoding/decoding system according to an example. FIG. 6 is a block diagram showing the configuration of a video encoding device according to the example. FIG. 7 is a block diagram showing the configuration of a video decoding device according to the example.

As shown in FIG. 5, a video encoding/decoding system 100A according to an example includes: a video encoding device (ENCODING DEVICE) 10A; a transmission path (TRANSMISSION LINE) 30 on which the encoded image, which is the output of the video encoding device 10A, is transmitted; and a video decoding device (DECPDING DEVICE) 20A coupled to the transmission destination. The video encoding device 10A includes an encoding part 11 for encoding an image, a diagnostic image generation part 12 for generating a diagnostic image, and a switching circuit 13 for switching between the input image and the diagnostic image generated by the diagnostic image generation part 12. The encoding part 11 includes a coefficient calculation unit (CC) 111, a local decoding image generation unit (LD) 112, and a variable length encoding unit (VLE) 113. The video decoding device 20A includes a decoding part 21 for decoding the encoded image, a check signal generation part 22A for generating a check sum, a storage part 23 for storing the check sum of the diagnostic image as well as the check sum generated by the check signal generation part 22A, and a comparison part 24A for comparing the check sum generated by the check signal generation part 22A with the check sum stored in the storage part 23. The decoding part 21 outputs the decoded image (DECODED PICTURE). The transmission path 30 can be a wired communication path or a wireless one. However, the wired communication path is preferable in terms of security.

As shown in FIG. 6, the encoding part 11 of the video encoding device 10A includes: the coefficient calculation unit 111 including a subtractor 2, an encoder 4, a motion estimation unit 7, and a motion compensation unit (MC) 8; the local decoding image generation unit 112 including a frame store (FS) 3, an adder 5, and a partial decoder 6; and the variable length encoding unit 113.

The normal image and the diagnostic image are received by an input node 1. The subtractor 2 generates the difference between the signal of the input node 1 and the prediction signal from the motion compensation unit 8. Then, the difference is encoded by the encoder 4. The input to the frame store 3 is the sum of the prediction signal, which is generated by the adder 5, and the encoded differential signal decoded by the partial decoder 6.

The prediction is achieved by delaying one frame, which is simply done by the frame store 3. The motion estimation unit 7 compares the frame of the image that is currently encoded with the previous frame in the frame store 3. Then, the area in which the target block is the most similar in the previous frame is identified with respect to each of the blocks obtained by dividing the current frame. The vector difference in the position between the identified area and the target block is called motion vector (MV) because it shows the movement of the object in the scene shown by the displayed image. The vector difference is supplied to the motion compensation unit 8. The motion compensation unit 8 contributes to better prediction by shifting the identified area of the previous frame to the position of the related block in the current frame. As a result, the difference formed by the subtractor 2 is smaller in average, allowing the encoder 4 to encode the image by using a lower rate than the case of larger difference. The variable length encoding unit 113 generates a bit stream based on the output of the encoder 4 and on the motion vector (MV) and outputs to the transmission path 30.

As shown in FIG. 7, the decoding part 21 includes a decoder 6', a motion compensation unit 8', a frame store 3', and an adder 5'. First, the operation opposite to every encoding operation performed in the encoder 4, is performed in the decoder 6' to generate an inter-frame differential signal. The decoder 6' is similar to the decoder 6. The inter-frame differential signal is then added to the prediction from the frame store 3' passing through the motion compensation in the motion compensation unit 8' that receives the motion vector (MV) from the video encoding device 10A. The output of the adder 5' forms an output of the decoding part and is supplied to the input of the frame store 3'.

Although not shown, it is also possible to provide a buffer in the output of the video encoding device 10A and in the input of the video decoding device 20A, in order to transmit data over a fixed bit rate channel.

For example, the video encoding device 10A and the video decoding device 20A are semiconductor devices each formed on a single semiconductor substrate. Both the video encoding device 10A and the video decoding device 20A may be formed on a single semiconductor substrate. In this case, the transmission side and the reception side use the same semiconductor device, in which the transmission side uses only the function of the video encoding device 10A and the reception side uses only the function of the video decoding device 20A. Note that each of the video encoding device 10A and the video decoding device 20A may not be formed on a single semiconductor substrate. Further, the encoding and decoding may be realized by software on the CPU.

Figure 8:
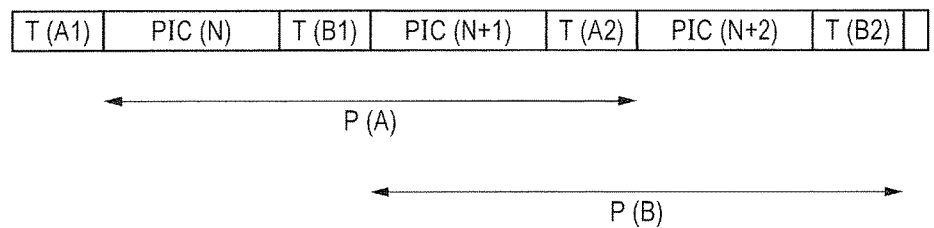
FIG. 8 is a timing diagram showing the second failure detection operation of the video encoding/decoding system according to the example.
Figure 9:
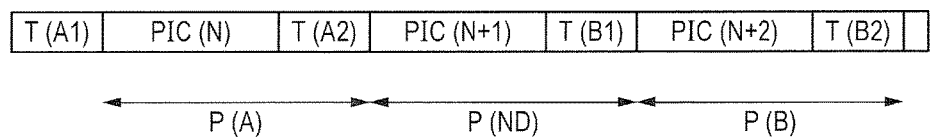
FIG. 9 is a timing diagram showing the effect of the second failure detection operation of the video encoding/decoding system according to the example.
Figure 10:
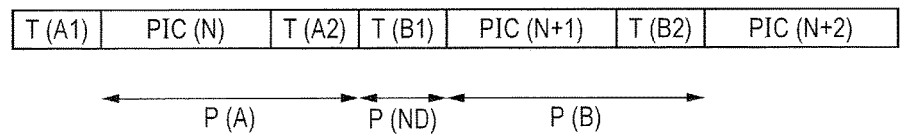
FIG. 10 is a timing diagram showing the effect of the second failure detection operation of the video encoding/decoding system according to the example.
Figure 11:
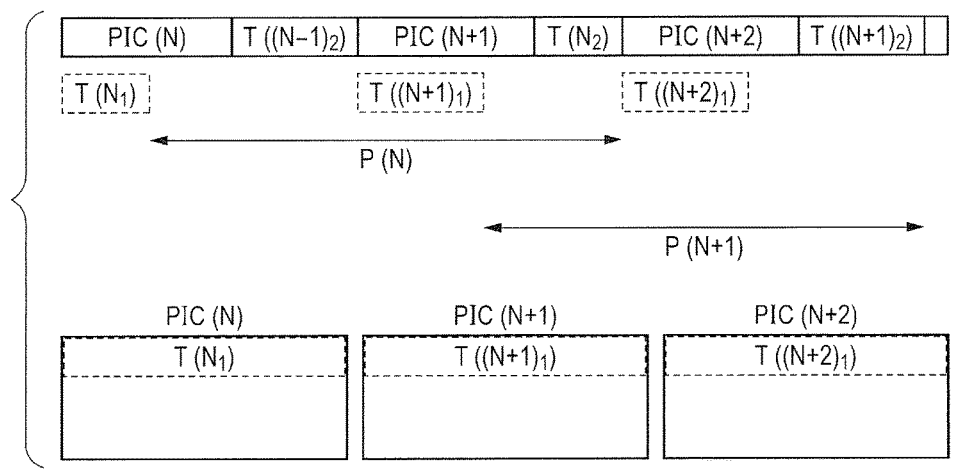
FIG. 11 is a timing diagram showing the third failure detection operation of the video encoding/decoding system according to the example.
Figure 12:
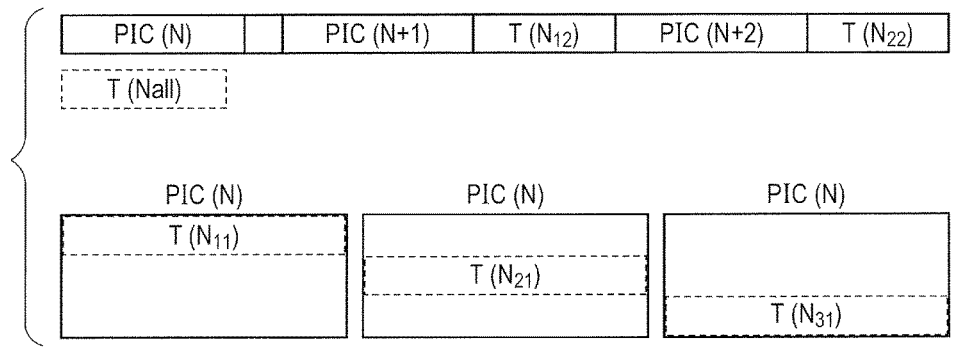
FIG. 12 is a timing diagram showing the third failure detection operation of the video encoding/decoding system according to the example.

Next, the failure detection operation of the video encoding/decoding system according to the example will be described with reference to FIGS. 8 to 12. FIG. 8 is a timing diagram showing the second failure detection operation of the video encoding/decoding system according to the example. FIGS. 9 and 10 are timing diagrams for illustrating the effect of the second failure detection operation of the video encoding/decoding system according to the example. FIG. 11 is a timing diagram showing the third failure detection operation (an example using a part of the input image) of the video encoding/decoding system according to the example. FIG. 12 is a timing diagram showing the third failure detection operation (an example using a part of the input image by changing the position) of the video encoding/decoding system according to the example.

The video encoding/decoding system 100A according to the example performs the same operation as the first, second, and third failure detection operations of the video encoding/decoding system according to the embodiment. The configuration or operation will be described more in detail below.

(1) First Failure Detection Operation

The encoding part 11 encodes the diagnostic image output from the diagnostic image generation part 12 and transmits to the video decoding device 20A. The decoding part 21 decodes the encoded image received from the video encoding device 10A. Then, the check signal generation part 22A generates a check sum of the decoded image. The comparison part 24A detects a failure by comparing the check sum generated by the check signal generation part 22A with the expected value (check sum) stored in the storage part 23 in advance. If the comparison result is a mismatch, the comparison part 24A determines that a failure has occurred and outputs (or activates) the failure detection signal.

The diagnostic image may be the data stored in a nonvolatile memory such as ROM or flash memory, or the data written in a nonvolatile memory, such as RAM, or a flash memory from the outside before operation, or the data that the diagnostic image generation part 12 generates by a predetermined arithmetic operation.

The data for comparison is not limited to the check sum, and check signals such as hash values, such as MD5 (Message Digest 5) and SHA-1 (Secure Hash Algorithm 1), as well as a cyclic redundancy check (CRC) code may also be used. The check sum can also be generated from the image before de-blocking filter in H.264 (MPEG-4 AVC). It is also possible that both the expected value for generating a check sum from the decoded image, and the expected value for generating a check sum from the image before de-blocking filter are stored in the storage unit 23. In this case, whether the check sum is generated from the decoded image or whether it is generated from the image before de-blocking filter may be switched according to the setting from the outside, or based on the signal and data transmitted from the video encoding device 10A. Note that the bit stream required for the failure detection operation has a data amount of at least about 1K bits, but the check sum has a data amount of about 100 bits. As a result, the storage cost can be reduced.

(2) Second Failure Detection Operation

The diagnostic image generation part 12 randomly generates a diagnostic image. Then, the encoding part 11 encodes the output diagnostic image and transmits to the video decoding device 20A. The decoding part 21 decodes the encoded image received from the video encoding device 10A. Then, the check signal generation part 22A generates a check sum of the decoded image. The encoding-decoding operation is performed twice on the same diagnostic image. Then, the comparison part 24A checks if there is a match between the first and second check sums stored in the storage part 23 in order to perform a diagnosis. If the comparison result is a mismatch, the comparison part 24A determines that a failure has occurred and outputs (or activates) the failure detection signal.

As shown in FIG. 8, it is assumed that the first encoding-decoding operation (failure detection operation) from the A image, which is the diagnostic image, is T(A1) and its second encoding-decoding operation (failure detection operation) is T(A2). Further, it is assumed that the first encoding-decoding operation from the B image, which is the next diagnostic image, is T(B1) and its second encoding-decoding operation is T(B2). In this case, T(A1), T(B1), T(A2), and T(B2) are performed in this order. Note that the diagnostic video encoding/decoding operation is performed during the pause period of normal video encoding/decoding operation (normal operations such as PIC(N), P·IC(N+1), and so on). When the period in which the failure can be detected by the failure detection operation from the A image is P(A) and when the period in which failure can be detected by the failure detection operation from the B image is P(B), there is an overlap between P(A) and P(B).

On the other hand, as shown in FIGS. 9 and 10, when T(A1), T(A2), T(B1), and T(B2) are performed in this order, there is no overlap in each of the periods of P(A) and P(B). As a result, a period (P(ND)) occurs in which failure may not be detected. By performing the failure detection operation in the order of this example, it is possible to eliminate the period (P(ND)) of not being able to detect failures.

The random generation method/algorithm can be arbitrary such as a linear feedback shift register (LFSR). Further, a plurality of predetermined data can be output periodically.

The encoding-decoding may be performed multiple (three or more) times on the same diagnostic image. At this time, the operations can be performed in any order as long as there is an overlap in the periods in which failure can be detected by the failure detection operations from the respective images.

(3) Third Failure Detection Operation

In the second failure detection operation, failure detection is performed by the normal video encoding/decoding operation (normal operation). Apart or whole of the input image is used as the diagnostic image in place of using the output of the diagnostic image generation part 12. In other words, in the normal video encoding/decoding operation, a part or whole of the input image as well as the encoding parameters are stored in the storage part (PICB), and the decoding result (the check sum generated from the decoded image) is stored in the storage part 34. Then, the same operation is performed again to obtain the decoding result (check sum). The comparison part 24A compares the obtained two check sums. If the comparison result is a mismatch, the comparison part 24A determines that a failure has occurred.

As shown in FIG. 11, PIC(N) and T(N1), PIC(N+1) and T((N+1)$_1$), T(N$_2$). PIC(N+2) and T((N+2)$_1$), T((N+1)$_2$) are performed in this order. Here, the normal operation with respect to the N frame is PIC(N), its first failure detection operation is T(NO, its second failure detection operation is T(N$_2$). Then, the normal operation with respect to the next N+1 frame is PIC(N+1), its first failure detection operation is T((N+1)$_1$), and its second failure detection operation is T((N+1)$_2$). Further, the normal operation with respect to the N+2 frame is PIC(N+2), its first failure detection operation is T((N+2)$_1$), and its second failure detection operation is T((N+2)$_2$). T(N$_1$), T((N+1)$_1$), and ((N+1)$_2$) are performed by using a part of PIC(N), PIC(N+1), and PIC(N+2), respectively. When the periods in which failure can be detected by T(N$_1$) and T(N$_2$) are P(N) and T((N+1)$_1$) and when the period in which failure can be detected by T((N+1)$_2$) is P(N+1), there is an overlap between P(N) and P(N+1) similarly to the case of the second failure detection operation. Thus, it is possible to eliminate the period in which failure may not be detected.

As shown in FIG. 12, when a part of the input image is used, the failure detection operation may be performed over several frames by changing positions. T(Nall) is the first failure detection operation of PIC(N), and uses the whole of the input image. However, the second failure detection operation is performed separately, for example, three times. T(N$_{12}$) of the second failure detection operation with respect to T(N$_{11}$), which is a part of the first failure detection operation, is performed between PIC(N+1) and PIC(N+2). T(N$_{22}$) of the second failure detection operation with respect to T(N$_{21}$), which is a part of the first failure detection operation, is performed after PIC(N+2). T(N$_{32}$) of the second failure detection operation with respect to T(N$_{31}$), which is a part of the first failure detection operation, is performed after the normal operation on the N+3 frame. In this way, the failure detection operation of the whole input image of the Nth frame is completed.

When only the third failure detection operation is performed, the output of the diagnostic image generation part 12 is not used, so that the video encoding/decoding system 1 may not include the diagnostic image generation part 12.

Figure 13:
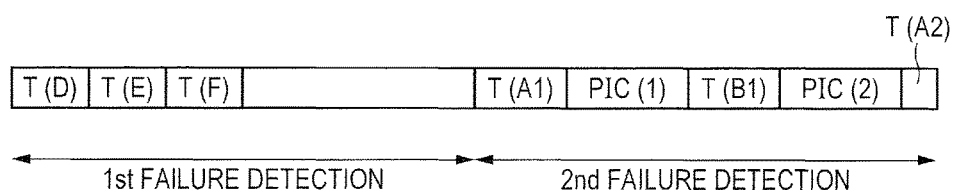
FIG. 13 is a timing diagram showing the operation that combines the first and second failure detection operations of the video encoding/decoding system according to an example.
Figure 14:
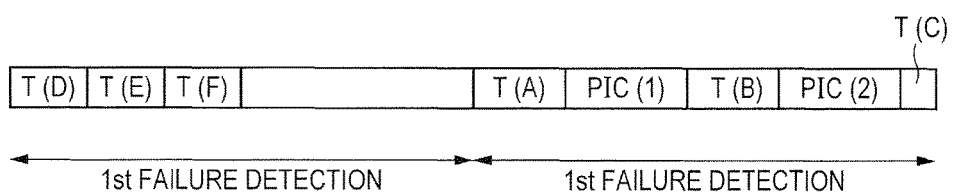
FIG. 14 is a timing diagram showing the operation with a combination of the first failure detection operation of the video encoding/decoding system according to the example.
Figure 15:
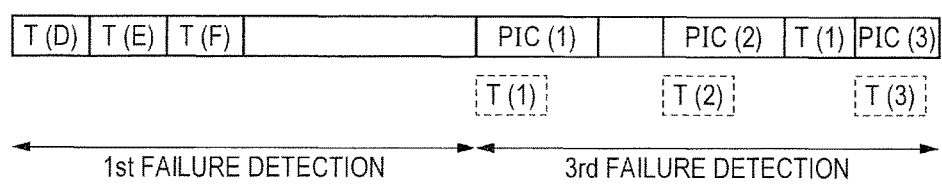
FIG. 15 is a timing diagram showing the operation with a combination of the first and third failure detection operations of the video encoding/decoding system according to an example.

The self-diagnosis function of the video encoding/decoding system 100A performs failure detection operation by one or a combination of the failure detection operations (1) to (3). Several examples will be described with reference to FIGS. 13 to 15. FIG. 13 is a timing diagram showing the operation with a combination of the first and second failure detection operations of the video encoding/decoding system according to the example. FIG. 14 is a timing diagram showing the operation with a combination of the first failure detection operation of the video encoding/decoding system according to the example. FIG. 15 is a timing diagram showing the operation with a combination of the first and third failure detection operations of the video encoding/decoding system according to the example.

As shown in FIG. 13, the first failure detection operation (1st FAILURE DETECTION) is performed before the start of the video transmission. After the start of the video transmission, the second failure detection operation (2nd FAILURE DETECTION) is performed during the pause period of the encoding-decoding operation. The memory capacity of the diagnostic image generation part 12 or the hardware capacity of the computing unit, or the like, must be increased in order to obtain sufficient coverage by only the first failure detection operation. In addition, the memory capacity of the storage part 23 in which the corresponding expected value is stored is large. On the other hand, if a failure occurs before the period in which the first failure can be detected (for example, before power on or other event), the failure may not be detected by only the second failure detection operation. By performing the second failure detection operation after the first failure detection operation, it is possible to reduce the period of not being able to detect failures and to reduce the diagnostic image generation part 12 as well as the storage part 23. Further, the second failure detection operation can increase the coverage, so that the number of times of the first failure detection operation, namely, the diagnosis time before video transmission can be reduced.

The first failure detection operation may be performed only once just after power on. It is also possible to perform, as shown in FIG. 14, the first failure detection operation with an arbitrary interval, in place of the second failure detection operation, during the pause period of the encoding-decoding operation after the start of the video transmission. This makes it possible to reduce the diagnosis time before the video transmission.

As shown in FIG. 15, the respective failure detection operations can be performed as follows: The first failure detection operation is performed before the start of the video transmission. The first operation of the third failure detection operation (3rd FAILURE DETECTION) is performed during the normal video encoding/decoding operation. Then, the second encoding-decoding operation of the third failure detection operation is performed during the pause period of the encoding-decoding operation. Similarly to the case of performing only the second failure detection operation, if a failure occurs before the period in which the first failure can be detected (for example, before power on or other event), the failure may not be detected by only the third failure detection operation. By performing the third failure detection operation after the first failure detection operation, it is possible to reduce the period of not being able to detect failures and to reduce the diagnostic image generation part 12 as well as the storage part 23. Further, the third failure detection operation can increase the coverage, so that the number of times of the first failure detection operation, the diagnosis time before video transmission can be reduced.

Further, the pause period of the encoding-decoding operation can be an arbitrary timing as long as it is not the period of performing the normal video encoding/decoding operation, such as the vertical blanking period between frames, the horizontal blanking period between lines, or the period that is set by forcibly stopping the encoding-decoding operation.

The first and second failure detection operations can be performed not only during the pause period of the encoding-decoding operation, but also during the normal video encoding-decoding operation period (normal operation period). In the input of the encoding process in the video encoding device 10A, the switching between the input image for the normal operation and the diagnostic image for the failure detection operation is performed in a predetermined unit of image area. For example, an image obtained by a fisheye lens that covers a wide range is typically subject to the distortion correction process to cut out the four corners, and is not used for display and image processing. When such an image is the input image, it is necessary to input it by switching a predetermined image area, such as 20×20 pixels on the left top corner, of the unwanted image areas, to the diagnostic image.

Compared to performing the failure detection operation during the pause period of the encoding-decoding operation, there is no need to perform the operation dedicated to failure detection and the power consumption is reduced.

Applications

The preferred embodiment and example can be applied to the video encoding/decoding device, the device having the video encoding decoding function, and the system using the same. For example, the preferred embodiment and example can be applied to in-vehicle cameras, in-vehicle periphery monitoring systems, in-vehicle driver support systems, in-vehicle automated driving systems, in-vehicle navigation systems, drive recorders, display audio systems, monitoring camera systems, network cameras, smartphones, tablets, digital cameras, camcorders, set top boxes (STB), Blu-ray Disc (BD) recorders, and the like.

Figure 16:
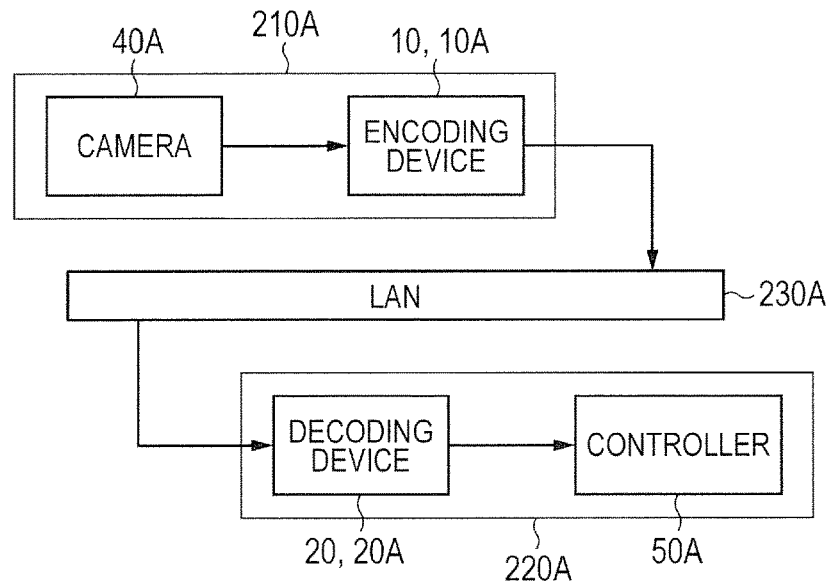
FIG. 16 is a block diagram showing a video encoding/decoding system according to Application Example 1.
Figure 17:
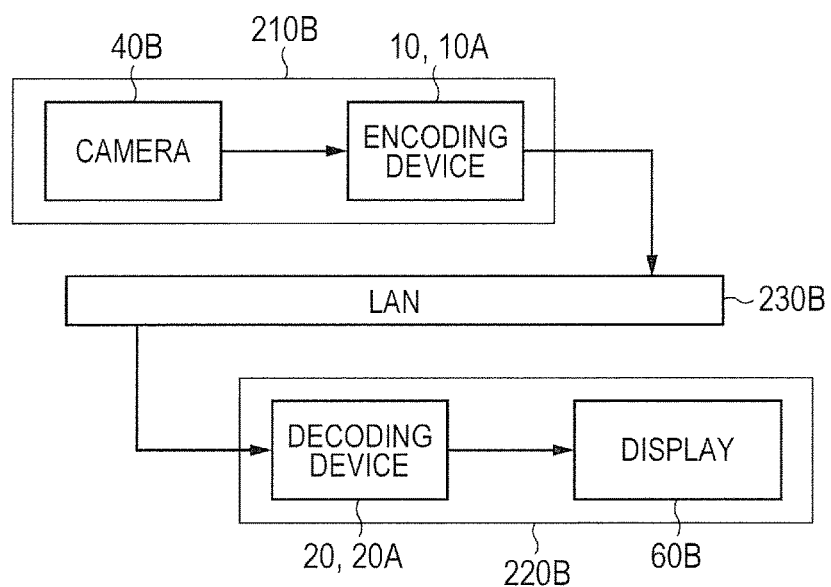
FIG. 17 is a block diagram showing a video encoding/decoding system according to Application Example 2.
Figure 18:
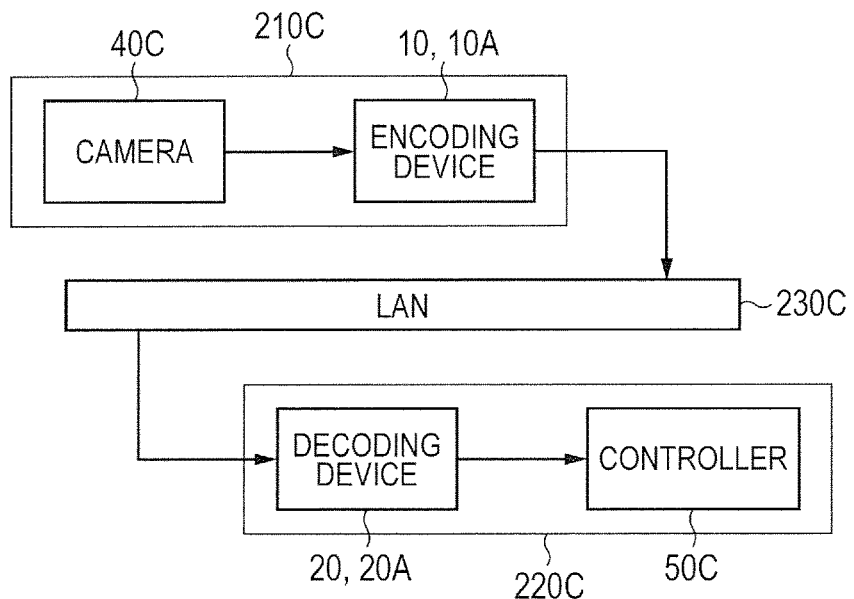
FIG. 18 is a block diagram showing a video encoding/decoding system according to Application Example 3.
Figure 19:
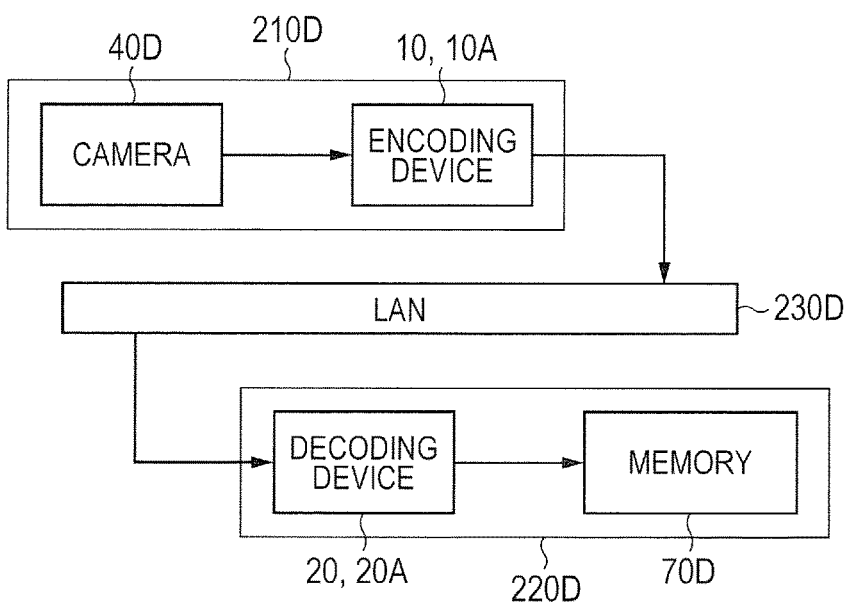
FIG. 19 is a block diagram showing a video encoding/decoding system according to Application Example 4.

The first to fourth applications (Application Examples 1 to 4) of the preferred embodiment and example will be described with reference to FIGS. 16 to 19. FIG. 16 is a block diagram showing the configuration of a video encoding/decoding system according to Application Example 1. FIG. 17 is a block diagram showing the configuration of a video encoding/decoding system according to Application Example 2. FIG. 18 is a block diagram showing the configuration of a video encoding/decoding system according to Application Example 3. FIG. 19 is a block diagram showing the configuration of a video encoding/decoding system according to Application Example 4.

As shown in FIG. 16, a video encoding/decoding system 200A according to Application Example 1 includes an in-vehicle camera 210A and a control unit 220A, which is a system in which the in-vehicle camera 210A and the control unit 220A are coupled to an in-vehicle local area network (LAN) 230A such as Ethernet Audio Video Bridging (AVB). The in-vehicle camera 210A includes an imaging device (CAMERA) 40A and a video encoding device (ENCODING DEVICE) 10, 10A. The control unit 220A includes a video decoding device (DECODING DEVICE) 20, 20A and a control unit (CONTROLLER) 50A for controlling driver support and automated driving or other functions, based on the decoded image. The video encoding/decoding system 200A may further include a display device for displaying the decoded image.

As shown in FIG. 17, a video encoding/decoding system 200B according to Application Example 2 includes an in-vehicle camera 210B and a display unit 220B, which is a system in which the in-vehicle camera 210B and the display unit 220B are coupled by an in-vehicle LAN 230B such as Ethernet AVB. The in-vehicle camera 210B includes an imaging device 40B and a video encoding device 10, 10A. The display unit 220B includes a video decoding device 20, 20A and a display device (DISPLAY) 60B for display the decoded image.

As shown in FIG. 18, a video encoding/decoding system 200C according to Application Example 3 includes a monitoring camera module 210C and a control unit 220C, which is a monitoring camera system in which the monitoring camera module 210C and the control unit 220C are coupled by LAN 230C such as Ethernet. The monitoring camera module 210C includes an imaging device 40C and a video encoding/decoding device 10, 10A. The control unit 220C includes a control device 50C and a video decoding device 20, 20A. The video encoding/decoding system 220C may further include a display device for display the decoded image.

As shown in FIG. 19, a video encoding/decoding system 200D according to Application Example 4 includes a monitoring camera module 210D and a recorder 220D, which is a monitoring camera system in which the monitoring camera module 201A and the recorder 220D are coupled by LAN 230D such as Ethernet. The monitoring camera module 210D includes an imaging device 40D and a video encoding device 10, 10A. The recorder 220D includes a video decoding device 20, 20A and a storage unit (MEMORY) 70D for storing the decoded image. The video encoding/decoding system 220D may further include a display device for displaying the decoded image.

In the video encoding/decoding systems according to Application Examples 1 to 4, it is possible to detect failure in all the paths from the image input part of the video encoding device to the image output part of the video decoding device. As a result, it is possible to improve safety and reliability.

The invention made by the present inventors has been concretely described based on the preferred embodiment, example, and applications. However, the present invention is not limited to the preferred embodiment, example, and applications. It is needless to say that various modifications and alterations can be made within the scope of the present invention.

EMBODIMENTS

A detailed description of the embodiments is added below.

Appendix 1

A video decoding device includes: a decoding part for decoding an encoded image; a check signal generation part for generating a check signal of the decoded image; a storage part for storing the expected value of the check signal of the diagnostic image, or storing the check signal generated by the check signal generation part; and a comparison part for comparing the check signal stored in the storage part with the check signal generated by the check signal generation part.

Appendix 2

The video decoding device according to Appendix 1 performs decoding and check signal generation multiple times, respectively, on the same decoded diagnostic image to compare a plurality of obtained check signals.

Appendix 3

The video decoding device according to Appendix 2 has a first period for performing a first decoding and check signal generation on a first encoded diagnostic image, a second period for performing a second decoding and check signal generation on the first diagnostic image, and a third period for performing a first decoding and check signal generation on a second encoded diagnostic image. The third period is provided between the first and second periods.

Appendix 4

The video decoding device according to Appendix 3 compares the check signal generated in the first period with the check signal generated in the second period, during the second period.

Appendix 5

The video decoding device according to Appendix 4 has a period for decoding a normal image, between the first and third periods and between the third and second periods.

Appendix 6

In the video decoding device according to Appendix 5, the check signal is a check sum.

Appendix 7

The video decoding device according to Appendix 1 performs decoding and check signal generation multiple times, respectively, on the same encoded normal image or part thereof to compare a plurality of obtained check signals.

Appendix 8

The video decoding device according to Appendix 7 has a first normal period for decoding a first encoded normal image, a first failure detection period for performing a first decoding and check signal generation on the first normal image or part thereof, a second failure detection period for performing a second decoding and check signal generation on the first normal image or part thereof, a second normal period for decoding a second encoded normal image, and a third normal period for decoding a third encoded normal image. The first failure detection period is included in the first normal period. The second failure detection period is provided between the second normal period and the third normal period.

Appendix 9

The video decoding device according to Appendix 8 compares the check signal generated in the first failure detection period with the check signal generated in the second failure detection period, during the second failure detection period.

Appendix 10

In the video decoding device according to Appendix 9, the check signal is a check sum.

Appendix 11

A video encoding device includes a diagnostic image generation part for generating a diagnostic image, and an encoding part for encoding the diagnostic image or normal image. The video encoding device performs encoding multiple times on the same diagnostic image or normal image, and transmits to the video decoding device.

Appendix 12

The video encoding device according to Appendix 11 has a first period for performing a first encoding on a first diagnostic image and for transmitting the data to the video decoding device, a second period for performing a second encoding on the first diagnostic image and for transmitting the data to the video decoding device, and a third period for performing a first encoding on a second diagnostic image and for transmitting the data to the video decoding device. The third period is provided between the first and second periods.

Appendix 13

The video encoding device according to Appendix 12 has a period for encoding the normal image, between the first and third periods and between the third and second periods.

Appendix 14

The video encoding device according to Appendix 11 has a first normal period for encoding a first normal image, a second failure detection period for performing a second encoding on the first normal image or part thereof, a second normal period for encoding a second normal image, a third normal period for encoding a third normal image, and a second failure detection period between the second normal period and the third normal period.

Appendix 15

A video encoding/decoding system includes: an imaging device; a video encoding device for encoding an image input from the imaging device; a video decoding device for decoding the encoded image; and a transmission path for transmitting the image encoded by the video encoding device, from the video decoding device. The video encoding device includes an encoding part for encoding a diagnostic image or the input image. The video decoding device includes: a decoding part for decoding the image encoded by the encoding part; a check signal generation part for generating a check signal of the decoded image; a storage part for storing the expected value of the check signal of the diagnostic image or the check signal generated by the check signal generation part; and a comparison part for comparing the check signal stored in the storage part with the check signal generated by the check signal generation part.

Appendix 16

The video encoding/decoding system according to Appendix 15 further includes a control device for controlling driver support or automated driving based on the image decoded by the video decoding device. The imaging device is an in-vehicle camera and the transmission path is an in-vehicle LAN.

Appendix 17

The video encoding/decoding system according to Appendix 15 further includes a display device for displaying the image decoded by the video decoding device. The imaging device is an in-vehicle camera and the transmission path is an in-vehicle LAN.

Appendix 18

The video encoding/decoding system according to Appendix 15 further includes a control device for performing control based on the image decoded by the video decoding device. The imaging device is a monitoring camera and the transmission path is a LAN.

Appendix 19

The video encoding/decoding system according to Appendix 15 further includes a storage unit for storing the image decoded by the video decoding device. The imaging device is a monitoring camera and the transmission path is a LAN.

What is claimed is:
1. A video encoding/decoding system comprising:
a video encoding device; and
a video decoding device,
wherein the video encoding device includes an encoding part for encoding an image including a diagnostic image or a normal image,
wherein the video decoding device includes:
a decoding part for decoding the image encoded in the encoding part;
a check signal generation part for generating a check signal of the decoded image from the encoded image;
a storage part for storing an expected value of the check signal of the diagnostic image, or storing the check signal generated by the check signal generation part; and
a comparison part for comparing the check signal stored in the storage part with the check signal generated by the check signal generation part,
wherein the video encoding/decoding system performs the encoding, decoding, and check signal generation a plurality of times, respectively on the same image or part thereof to detect failure,
wherein the video encoding device comprises a diagnostic image generation part for generating the diagnostic image,
wherein the encoding device is formed on a first semiconductor substrate, and
wherein the decoding device includes the decoding part, check signal generation part, storage part, and comparison part that are formed on a second semiconductor substrate or the first semiconductor substrate,
wherein the video encoding/decoding system perform encoding, decoding, and check signal generation multiple times, respectively, on the same diagnostic image to compare a plurality of obtained check signals,
wherein the video encoding/decoding system detects failure by comparing the expected value and a comparison value of the check signals generated by processing the same image or part thereof a plurality of times,
wherein to generate the expected value as a comparison target, the expected value of the check signal and a comparison value of the check signal is generated by the check signal generation part,
wherein the video encoding/decoding system includes:
a first period for performing a first encoding, decoding, and check signal generation on a first diagnostic image;
a second period for performing a second encoding, decoding, and check signal generation on the first diagnostic image; and
a third period for performing a first encoding, decoding, and check signal generation on a second diagnostic image, between the first and second periods,
wherein the third period overlaps at least one of the first period and the second period when failure is detected, such that there is an overlap in periods in which failure is detected from respective images.

2. A video encoding/decoding system according to claim 1,
wherein the check signal generated in the first period and the check signal generated in the second period are compared with each other during the second period.

3. A video encoding/decoding system according to claim 2,
wherein the video encoding/decoding system has a period for performing normal encoding and decoding, between the first and third periods and between the third and second periods.

4. A video encoding/decoding system according to claim 3,
wherein the check signal is a check sum,
wherein the video encoding device and the video decoding device includes a processor that executes computer instructions for encoding and decoding.

5. A diagnosis method of video encoding/decoding system including a first diagnosis step,
wherein the first diagnosis step comprises the steps of:
(a1) encoding an image including an image comprising a diagnostic image or a normal image;
(b1) decoding the encoded image into a decoded image;
(c1) generating a check signal of the decoded image; and
(d1) detecting a failure based on an expected value of the check signal of the diagnostic image and on the check signal generated in the (c1) step,
wherein the detecting of the failure includes performing the encoding, decoding, and generating the check signal a plurality of times, respectively, on the same image or part thereof,
wherein the first diagnosis step is performed after power on and before video transmission,
wherein the detecting of the failure includes performing the encoding, decoding, and generating the check signal a plurality of time, respectively, on the same image to compare a plurality of obtained check signals,
wherein the detecting of the failure includes comparing the expected value and the comparison value of the check signals by processing the same image or part thereof a plurality of times,
wherein the expected value of the check signal is generated by processing the same image or part thereof a plurality of times,
wherein the first diagnosis step is performed during a pause period of the encoding and decoding operation of the normal image,
wherein a plurality of periods of the encoding, decoding, and check signal generation are performed on a first diagnostic image,
wherein a plurality of periods of the encoding, decoding, and check signal generation are performed on a second diagnostic image, and
wherein there is an overlap in periods in which failure is detected from respective images.

* * * * *